US005408860A

United States Patent [19]

Bair et al.

[11] Patent Number: 5,408,860

[45] Date of Patent: Apr. 25, 1995

[54] RAM DRIVE MECHANISM HAVING A PIVOTED DRIVE LINK

[75] Inventors: William H. Bair, Marysville; Kenneth F. Folk, Harrisburg, both of Pa.

[73] Assignee: The Whitaker Corporation, Wilmington, Del.

[21] Appl. No.: 53,875

[22] Filed: Apr. 26, 1993

[51] Int. Cl.$^{6}$ .......................... B21J 9/18; F16H 21/22

[52] U.S. Cl. .......................................... 72/450; 74/44

[58] Field of Search ............................... 74/44; 72/450

[56] References Cited

U.S. PATENT DOCUMENTS

| | | | |
|---|---|---|---|
| 232,451 | 9/1880 | Brown | 74/44 |
| 952,979 | 3/1910 | Cummins | 74/44 |
| 2,542,810 | 2/1951 | Gray | 74/44 |
| 5,014,539 | 5/1991 | Eich | 72/452 |

*Primary Examiner*—John J. Vrablik

*Attorney, Agent, or Firm*—Robert J. Kapalka

[57] ABSTRACT

A ram drive mechanism for an automated terminal crimping machine of the type having a rotating crank shaft with an offset crank pin (2) protruding therefrom and orbiting about the rotation axis of the crank shaft. The mechanism includes a ram (20) mounted for reciprocating motion in a first direction toward a crimping zone and in a second direction away from a crimping zone. The ram (20) carries tooling for performing a terminal crimping operation. The invention also includes a ram drive linkage comprising a drive link (40) having a pivotal connection with the crank pin (2) at one end. An other end of the drive link (40) has a pivotal connection with a link pin (50). The drive linkage reciprocates the ram (20) in accordance with orbiting of the crank pin (2). The ram (20) is arranged such that the one end of the drive link is disposed relatively further in the first direction than the other end of the drive link, whereby the drive link is in tension during the reciprocation of the ram toward the crimping zone.

4 Claims, 5 Drawing Sheets

RAM DRIVE MECHANISM HAVING A PIVOTED DRIVE LINK

CROSS-REFERENCE TO RELATED APPLICATIONS

The present application is related to a pair of copending applications filed concurrently herewith and entitled "CRIMP HEIGHT ADJUSTMENT PIN FOR A RAM DRIVE MECHANISM" having Ser. No. 08/052,881 filed Apr. 26, 1993, and "SINGLE CYCLE POSITIONING SYSTEM" having Ser. No. 08/052,282 filed Apr. 26, 1991.

FIELD OF THE INVENTION

The present invention relates to a machine for crimping electrical terminals to conductors and, in particular, to a ram drive linkage for an automated terminal crimping machine.

BACKGROUND OF THE INVENTION

Automatic crimping presses have long been used in the connector industry to effect high-speed mass termination of various cables. FIGS. 1 and 2 are side and front views, respectively, of one exemplary automatic crimping "T-terminating unit" Model No. 768793 which is commercially available from AMP, Inc.® In general, such presses include a reciprocating ram group 1 which is driven by an electric motor 3 through a torque multiplication mechanism 5. Various crimping tool-heads may be secured to the underside of ram group 1, and the attached tool head is driven with the ram group into proximity with a continuous-feed applicator, shown generally as 8, which tenders the terminal(s) to be crimped.

Significant torque multiplication is necessary to generate a sufficient downward force for the crimping operation, and this is accomplished in the illustrated machine by a pulley-driven torque multiplication mechanism 5. More specifically, the electric motor 3 is housed on a lower shelf of the illustrated press. The motor 3 drives a pulley 4 which is housed in the rear of the press. The pulley 4 drives a belt 7 which extends upwardly and encircles a large flywheel 9, which in turn drives a cylindrical crank shaft through a clutch enclosed in flywheel 9. The crank shaft is rotatably seated in the upper section of the press and runs to the front of the press. An offset crank pin 2 protrudes forwardly from an end face of the crank shaft. The crank pin 2 is offset from the rotation axis of the crank shaft and orbits about the axis as the crank shaft is rotated.

The conventional automatic crimping presses are of a push link design wherein the crank pin 2 is directly coupled to a push link 6, which is in turn coupled to a ram 20 through a ball joint and socket 11. The crank pin 2 compresses the push link 6 and ram 20 downwardly during 180° of its orbit to advance the entire ram group 1 and crimping tool head toward the applicator 8. This illustrated press and its commercial counterparts do not allow convenient adjustment of the crimp height to compensate for such things as tooling wear, dimensional tolerances of replacement parts, and dimensional changes due to temperature variations. Furthermore, the current configuration of the ram group 1 renders it difficult to incorporate a suitable retrofit adjustment feature.

Moreover, although the ram group 1 is reciprocated over a distance equal to a stroke length of the crank pin 2 which may be, for example, 1.625", the terminals are crimped in a crimping zone which extends only over a final portion of the downward displacement of the ram group, i.e., the final 0.1" of the downward displacement. Force required to displace the ram group 1 is relatively low except during actual crimping of the terminal, when forces on the order of several thousand pounds are required to deform the terminal. A greater mechanical advantage of the ram drive could be achieved by extending the portion of rotation of the crank pin 2 during which actual crimping occurs, thereby reducing a size requirement for the motor 3. Therefore, it would be desirable to concentrate most of the ram displacement during the early portion of the crank pin rotation away from top dead center so that a larger portion of the crank pin rotation could be devoted to performing the actual crimping. However, the existing push link design tends to produce a majority of the downward ram displacement during the final 90° of downward rotation of the crank pin, as shown by a plot of ram displacement versus crank pin rotation in FIG. 6. The plot of ram displacement versus crank pin rotation can be altered by altering the length of the push link, but at best, the push link design can only be made to produce an equal displacement of the ram during the initial 90° of crank pin downward rotation and the final 90° of crank pin downward rotation, i.e., a pure sinusoidal motion. It would be advantageous to provide a crimping machine which produces a majority of the ram displacement during the initial 90° of crank pin downward rotation in order to increase the angle of crank pin rotation devoted to performing the crimping. The present invention accomplishes this by employing a tensioned linkage to pull the ram downward rather than compressive force on a push link. The present invention also facilitates the OEM or retrofit addition of a crimp height adjustment feature.

SUMMARY OF THE INVENTION

It is an object of the invention to provide an improved ram drive mechanism for an automated terminal crimping machine.

It is another object of the invention to provide a ram drive mechanism that increases force concentration at the bottom of a ram drive stroke.

It is yet another object of the invention to provide a ram drive mechanism having a reduced power input requirement.

It is still another object of the invention to provide a ram drive mechanism having lighter weight drive components and reduced overall structure size.

It is still another object of the invention to provide a ram drive mechanism wherein all moving parts of the drive linkage are contained behind the ram and are shielded thereby for the safety of the operator.

It is still another object of the invention to provide a ram drive mechanism which facilitates the addition of a crimp height adjustment feature.

These and other objects are accomplished by a ram drive mechanism including a drive shaft having an offset drive member at one end which orbits about an axis of the drive shaft during rotation thereof. Means such as an electric motor are provided for rotating the crank shaft. A ram is mounted for reciprocating motion in a first direction toward a crimping zone and in a second direction away from the crimping zone. A drive link has one end pivotally connected to the drive member and an other end coupled to the ram for reciprocating the ram in accordance with the orbiting of the drive member. The ram is arranged such that the one end of the drive link is disposed relatively further in the first direction than the other end of the drive link. By this arrangement, the drive link is in tension during the reciprocation of the ram toward the crimping zone. This pull link arrangement increases the angle of crank shaft rotation that is available for moving the ram when the ram is in the crimping zone, thereby increasing force concentration on the ram in the crimping zone.

In accordance with another aspect of the invention, a portion of the ram defines a cavity bounded by walls, and the ram carries a link pin which extends through the cavity and is supported by opposite ones of the walls. An aperture extends from the cavity through one of the opposite walls. The drive member comprises a crank pin extending from the one end of the crank shaft through the aperture. The drive link is disposed within the cavity, and the one end of the drive link defines a bore which receives the crank pin therein.

DETAILED DESCRIPTION OF THE PREFERRED EMBODIMENT

Figure 1:
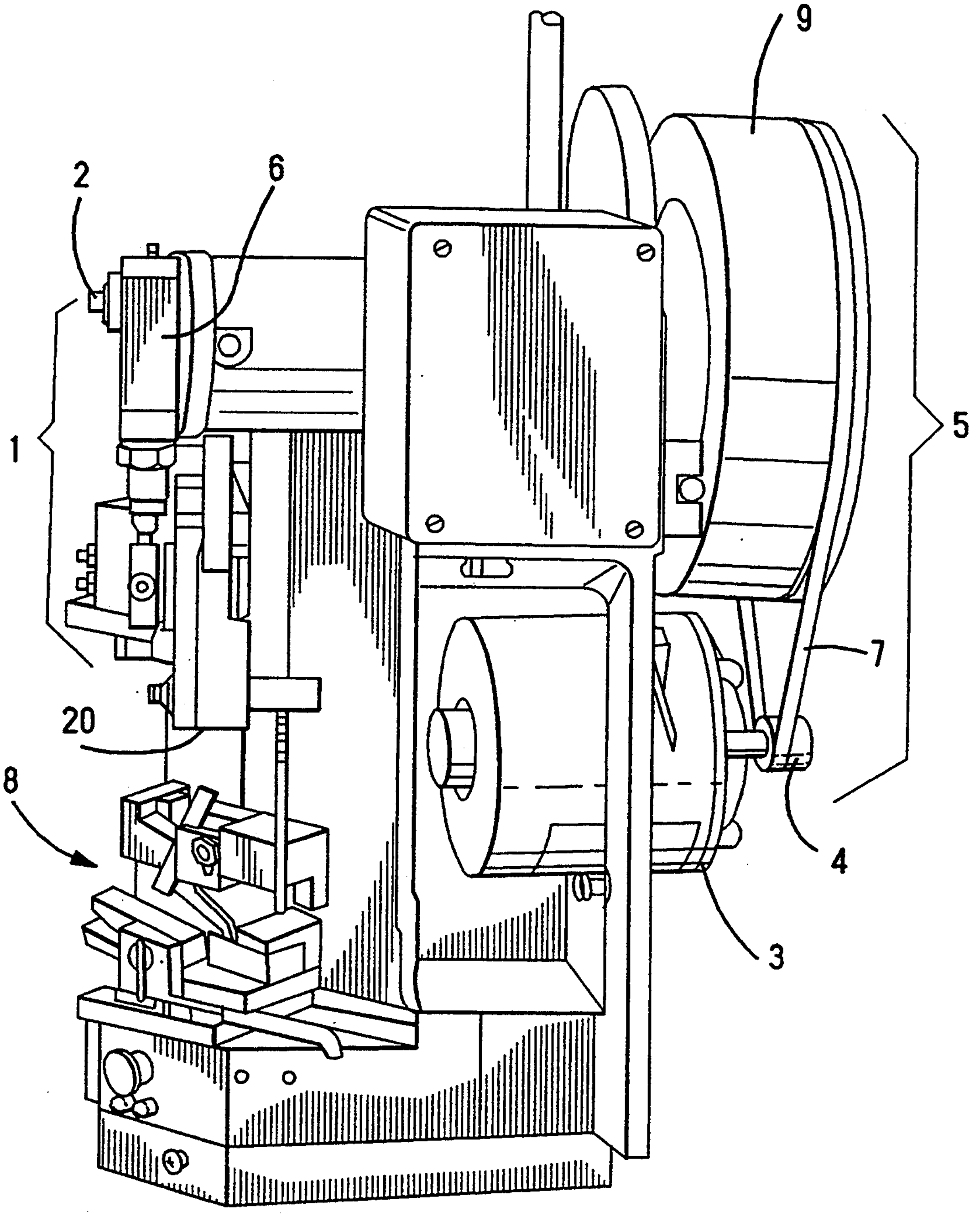
PRIOR ART Fig. 1
FIGS. 1 and 2 are side and front perspective views, respectively, of a conventional automated terminal crimping machine.
Figure 2:
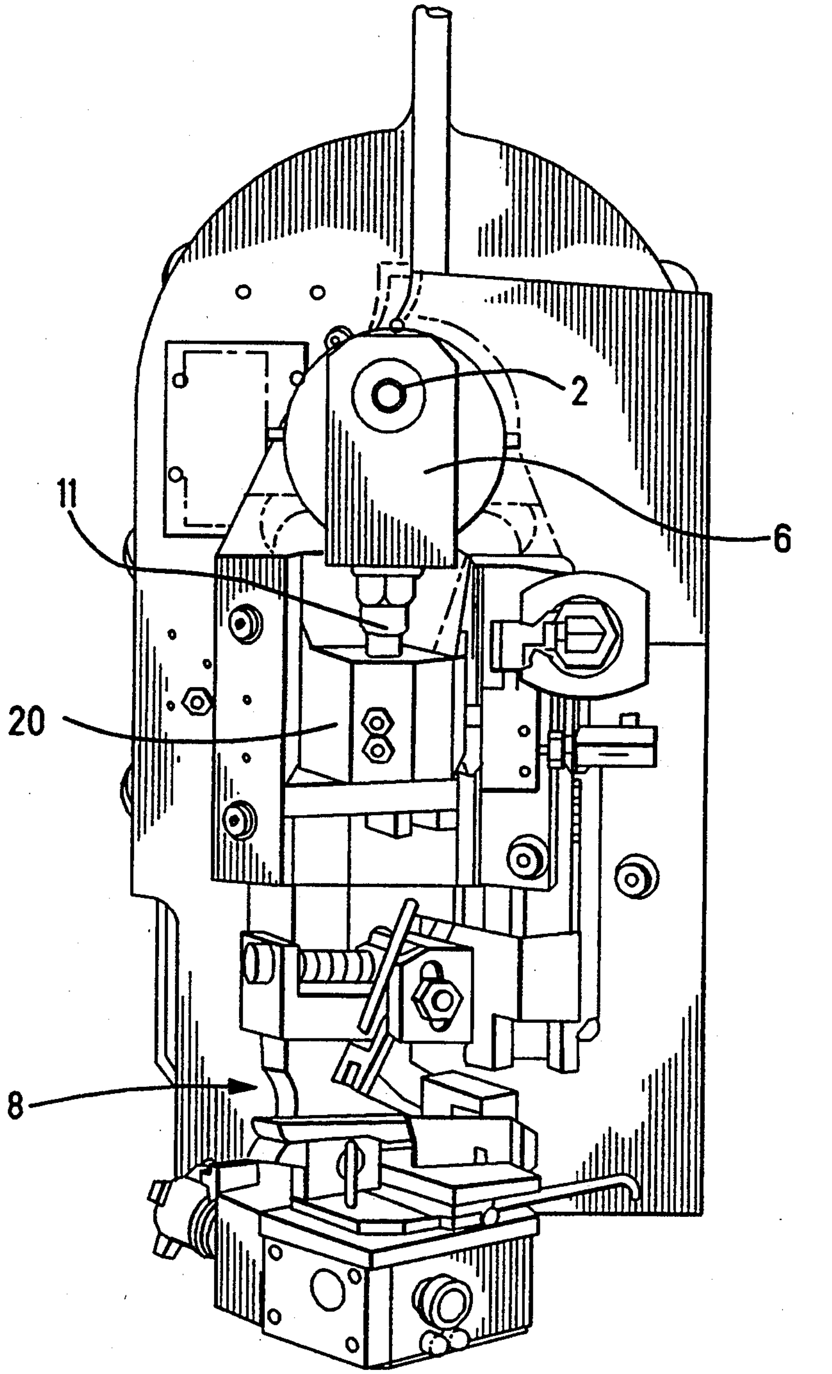
PRIOR ART Fig. 2

FIGS. 1 and 2 illustrate an existing automatic crimping "T-terminating unit" Model No. 768793 which is commercially available from AMP, Inc.® Such a press can be modified by incorporating the ram drive mechanism of the present invention. The press includes a ram group 1 including a reciprocating ram 20 which is driven by an electric motor 3 through a torque multiplication mechanism 5. A crank shaft is rotatably seated in an upper section of the press for transferring motion from the torque multiplication mechanism 5 to the ram group 1. Various crimping tool-heads may be secured to the underside of the ram 20, and the attached tool head is driven downward by the ram 20 into working proximity with a continuous-feed terminal applicator 8 which positions terminals to be crimped.

Figure 3:
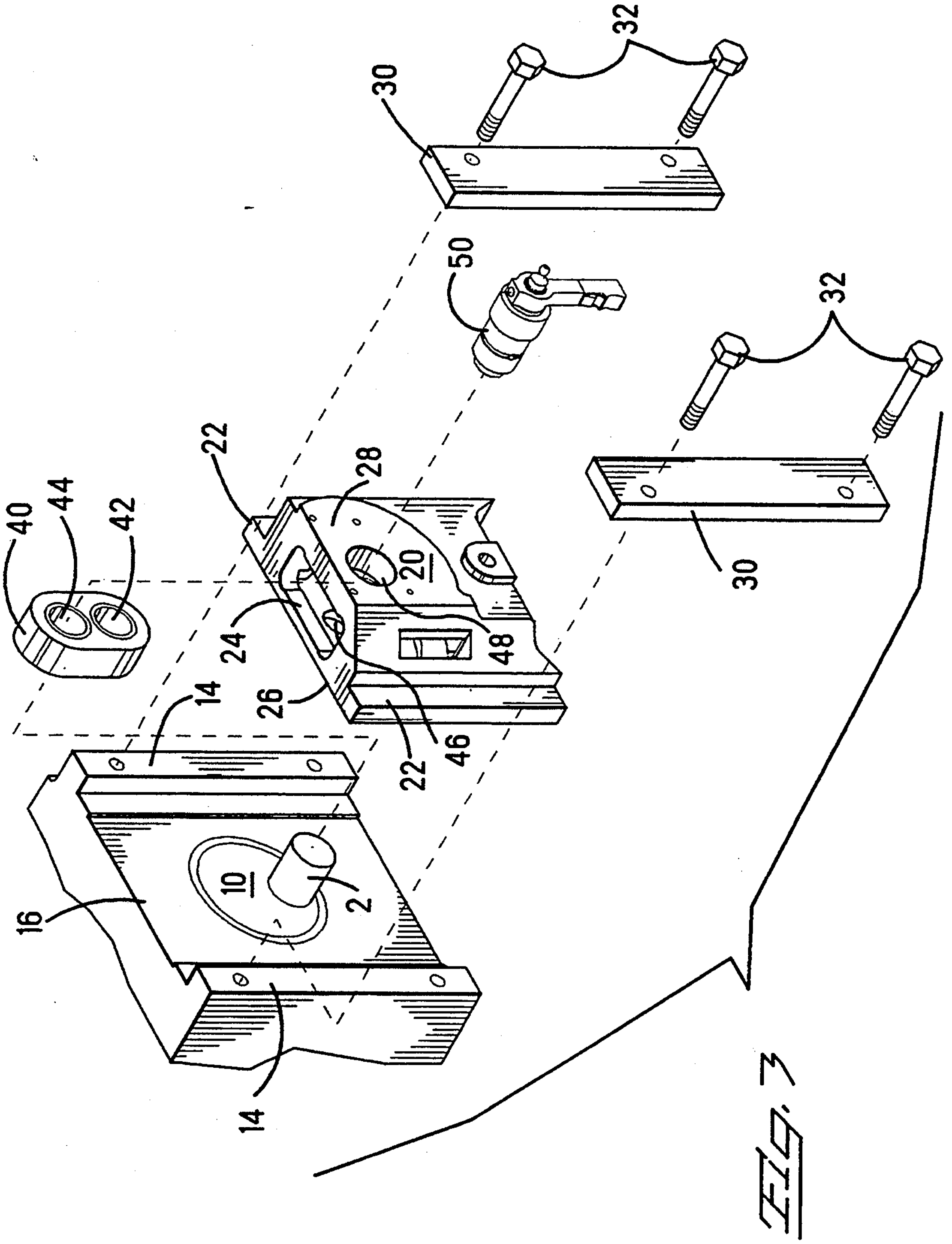
FIG. 3 is an exploded perspective view of the ram drive mechanism according to the present invention.

FIG. 3 is an exploded perspective view of the ram drive mechanism of the present invention incorporated in the automatic terminal crimping machine shown in FIGS. 1 and 2. The crank shaft, shown as 10 in FIG. 3, extends to a front of the press, and drive member 2 protrudes forwardly from the end face of the crank shaft. In the preferred embodiment shown, the drive member 2 is a crank pin which is offset from a rotation axis of the crank shaft and orbits about the axis as the crank shaft rotates. However, other equivalent configurations for the drive member 2, such as an offset bore defined in the end face of the crank shaft 10, will be readily apparent to those skilled in the art, and the drive member 2 is intended to include all equivalent configurations without limitation to the preferred embodiment.

The ram drive mechanism of the present invention includes a modified ram 20 which is formed as a hollow block with flanged edges 22 on either side. An interior of the hollow block defines a cavity 24. The ram 20 is received within channel 16 defined between side rails 14 of the press. The ram 20 is held captive within the channel 16 by a pair of gibs 30 which are secured to the side rails 14 of the press by threaded fasteners 32. The edges 22 are slidably held behind the gibs 30 to permit vertical sliding movement of the ram 20.

Figure 4:
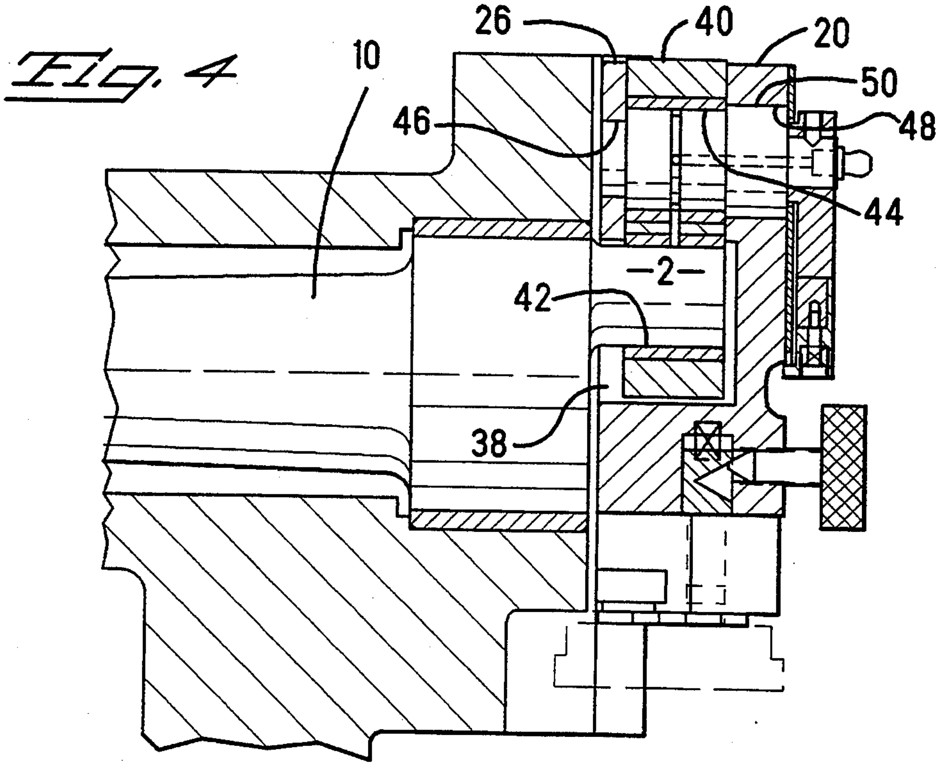
FIG. 4 is a side cross-sectional view of the ram drive mechanism of FIG. 3.

A back wall 26 of the ram 20 defines an aperture 38, shown in FIG. 4, which provides an opening through which the crank pin 2 extends into the cavity 24. The aperture 38 is sufficiently large to provide clearance for unobstructed orbiting of the crank pin 2 therein.

As shown in FIGS. 3 and 4, a drive link 40 comprises an integral member having a lower bore 42 at one end and an upper bore 44 at an other end. The drive link 40 resides in the cavity 24 of the ram 20. The crank pin 2 protrudes through the aperture 38 and is pivotally received in the lower bore 42 of the drive link 40. From the pivotal connection with the crank pin 2, the drive link 40 extends upwardly within the cavity 24. The back wall 26 and front wall 28 of the ram 20 define throughbores 46, 48, respectively, at positions which correspond to the upper bore 44 of the drive link 40.

A link pin 50, such as shown and described in detail in co-pending application Ser. No. 08/052,881 filed Apr. 26, 1993 and entitled "CRIMP HEIGHT ADJUSTMENT PIN FOR A RAM DRIVE MECHANISM", is pivotally received in the upper bore 44 of the drive link 40 and is secured within the bores 46, 48 of the ram 20. The link pin 50 provides a pivotal connection of the drive link 40 to the ram 20. Hence, the ram drive linkage of the present invention includes a first, or lower, pivotal connection between the crank pin 2 and the drive link 40 via the crank pin 2 nesting in the lower bore 42, and a second, or upper, pivotal connection between the ram 20 and drive link 40 via the link pin 50 nesting in the upper bore 44.

In operation, rotation of the crank shaft 10 effects an orbiting motion of the crank pin 2 about a rotation axis of the crank shaft 10. Each orbit of the crank pin 2 produces both a side-to-side displacement and a vertical displacement of the crank pin 2. The side-to-side component is absorbed by the drive link 40 which simply pivots back and forth in a pendulum motion. Hence, the side-to-side component generates no motion of the ram 20.

The vertical displacement component of the crank pin 2 is translated directly into a vertical reciprocating motion of the ram 20. As the crank pin 2 orbits upwardly, the drive link 40 is compressed against the link pin 50, which in turn slides the ram 20 upwardly between the rails 30. Conversely, downward displacement of the crank pin 2 tensions the drive link 40 and pulls the ram 20 downwardly between the side rails 14. It is this downward reciprocation of the ram 20 which results in a crimping blow against a terminal supported on lower crimping tooling on a base of the press.

Figure 6:
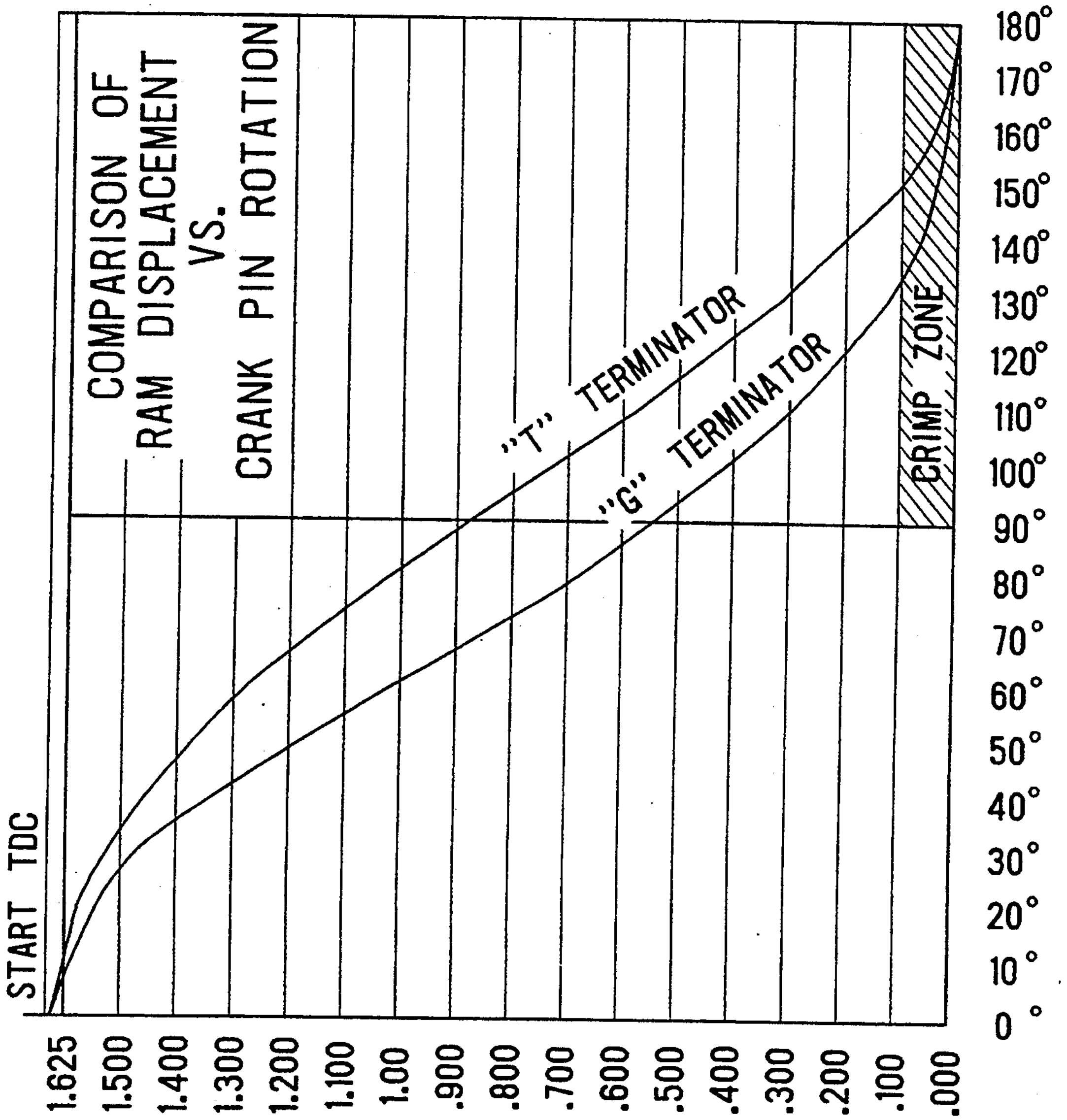
FIG. 6 is a graph of ram displacement vs. crank shaft rotation for a prior art crimping press having a push link and for a crimping press having a pull link ram drive mechanism according to the invention.

The drive link 40 remains tensioned throughout the entire downward motion of the ram 20, and this tensioned drive favorably modifies the downward motion and force characteristics of the crimping blow. FIG. 6 graphically illustrates ram displacement as a function of crank shaft angle in a "T Terminator" press having the prior art push link design, and in a "G Terminator" press having a pull link ram drive mechanism according to the invention. As shown in FIG. 6, the "T Terminator" produces a ram displacement wherein a greater portion of the ram movement occurs in the final 90° of crank shaft rotation than in the initial 90° of crank shaft rotation. Also, the ram dwells in the "crimp zone", i.e., the final 0.1" of ram displacement, for approximately 28° of the crank shaft rotation. In comparison, the "G Terminator" produces approximately two-thirds of the ram downward displacement in the initial 90° of crank shaft rotation. Thereafter, the ram continues downward at a slower rate than the comparable ram on the "T Terminator". However, due to the large gain in displacement of the ram in the "G Terminator" during the initial 90° of crank shaft rotation, the ram enters the crimp zone approximately 43° before bottom dead center of the crank shaft rotation, thereby providing an increased dwell time in the crimp zone and increased force transmission through the ram for acting against the terminal.

In addition, moving parts of the ram drive linkage are contained behind the ram 20 and are shielded thereby for the safety of the operator.

Moreover, the use of the above-described ram drive linkage according to the present invention facilitates the use of a crimp height adjustment feature to compensate for tolerances in the tool heads, terminal pins, etc.

Figure 5:
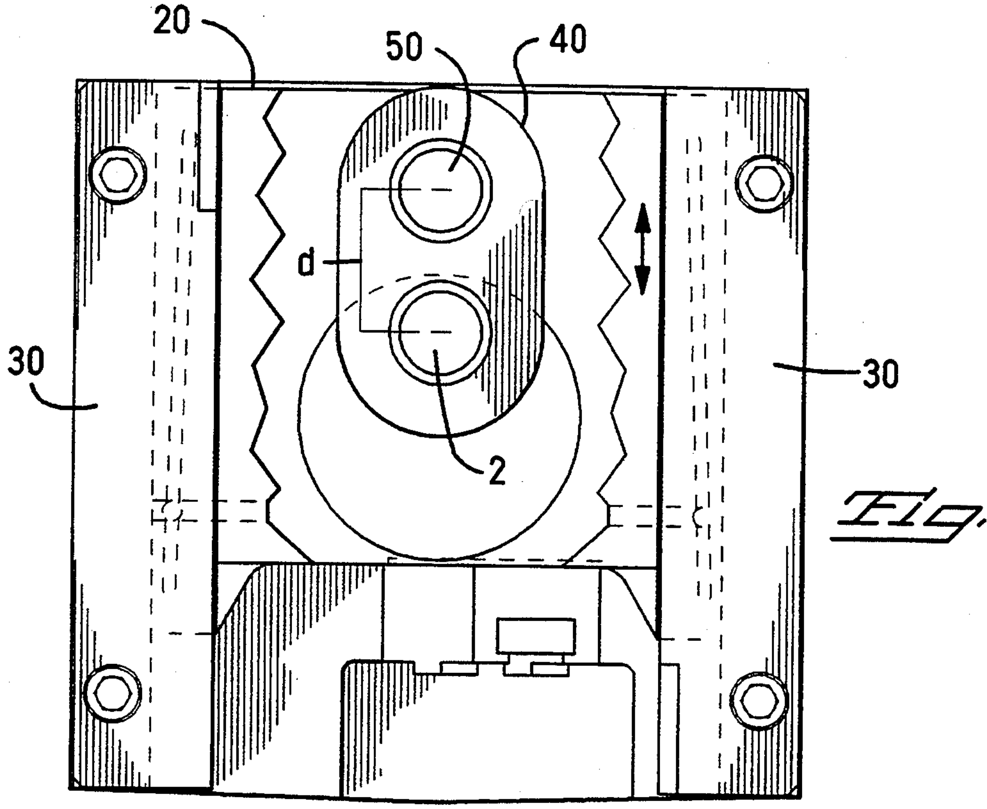
FIG. 5 is a front cut-away view of the ram drive mechanism of FIGS. 3 and 4.

As shown in the break-away view of FIG. 5, the crimp height can be easily adjusted by varying the vertical separation d between the first pivotal connection with the crank pin 2, and the second pivotal connection with the link pin 50. The link pin 50 includes an eccentric, and the crimp height can be adjusted by rotatably adjusting the link pin 50 in the manner shown and described in copending application Ser. No. 08/052,881 filed Apr. 26, 1993 entitled "CRIMP HEIGHT ADJUSTMENT PIN FOR A RAM DRIVE MECHANISM."

Having now fully set forth a detailed example incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

We claim:

1. A ram drive mechanism for an automated terminal crimping machine, comprising:
   - a crank shaft having an offset drive member at one end which orbits about an axis of the crank shaft during rotation thereof;
   - means for rotating the crank shaft;
   - a ram mounted for reciprocating motion in a first direction toward a crimping zone and in a second direction away from the crimping zone, the ram having a cavity surrounded by walls;
   - a link pin carried by the ram, the link pin extending through the cavity and being supported by opposite ones of the walls; and,
   - a drive link having one end pivotally connected to the drive member and an other end disposed within the cavity and pivotally connected to the link pin for reciprocating the ram in accordance with the orbiting of the drive member;
   - wherein the ram is arranged such that the one end of the drive link is disposed relatively further in the first direction than the other end of the drive link, whereby the drive link is in tension during the reciprocation of the ram toward the crimping zone.

2. The ram drive mechanism according to claim 1, wherein an aperture extends from the cavity through one of the opposite walls of the ram, the drive member comprises a crank pin extending from the one end of the crank shaft through the aperture, and the crank pin engages in a bore defined by the one end of the drive link.

3. In an automated terminal crimping machine including a crank shaft and means for rotating said crank shaft about a rotation axis, said crank shaft having a face at one end and a drive member defined by said face, said drive member being offset from said rotation axis for orbiting about said rotation axis during rotation of said crank shaft, and a ram mounted for orthogonal reciprocation with respect to said rotation axis in a first direction toward a crimping zone and a second direction away from the crimping zone, an improved ram drive mechanism comprising:
   - a link pin carried by said ram, said link pin extending parallel to said rotation axis of said crank shaft through a cavity defined by said ram, said link pin being supported by surrounding walls of said cavity; and
   - a drive link having one end pivotally connected to said drive member, said drive link extending within said cavity perpendicular to said rotation axis, said drive link having an other end pivotally connected to said link pin;
   - wherein the ram is arranged such that the one end of the drive link is disposed relatively further in the first direction than the other end of the drive link, whereby the drive link is in tension during the reciprocation of the ram toward the crimping zone.

4. The improved ram drive mechanism according to claim 3, wherein an aperture extends from said cavity through one of said surrounding walls, said drive member comprises a crank pin extending from said face of said crank shaft through said aperture, and said crank pin engages in a bore defined by said one end of said drive link.

* * * * *